US008385432B2

(12) United States Patent
Chen et al.

(10) Patent No.: US 8,385,432 B2
(45) Date of Patent: Feb. 26, 2013

(54) METHOD AND APPARATUS FOR ENCODING VIDEO DATA, AND METHOD AND APPARATUS FOR DECODING VIDEO DATA

(75) Inventors: Ying Chen, Beijing (CN); Jiefu Zhai, Middlesex, NJ (US); Kui Gao, Beijing (CN); Kai Xie, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 1498 days.

(21) Appl. No.: 11/920,819

(22) PCT Filed: May 3, 2006

(86) PCT No.: PCT/EP2006/061994
§ 371 (c)(1),
(2), (4) Date: Nov. 20, 2007

(87) PCT Pub. No.: WO2006/125713
PCT Pub. Date: Nov. 30, 2006

(65) Prior Publication Data
US 2009/0041121 A1    Feb. 12, 2009

(30) Foreign Application Priority Data
May 27, 2005 (EP) .................................. 05300426

(51) Int. Cl.
*H04N 7/12* (2006.01)
(52) U.S. Cl. ................................. 375/240.29
(58) Field of Classification Search .................. None
See application file for complete search history.

(56) References Cited

U.S. PATENT DOCUMENTS

| | | | |
|---|---|---|---|
| 5,446,495 A * | 8/1995 | Tourtier et al. .......... 375/240.11 |
| 2001/0048720 A1 * | 12/2001 | Koshiba et al. .......... 375/240.16 |
| 2002/0051488 A1 * | 5/2002 | Li ................................. 375/240 |
| 2002/0118759 A1 * | 8/2002 | Enficiaud et al. ........ 375/240.19 |
| 2002/0141503 A1 * | 10/2002 | Kobayashi et al. ...... 375/240.27 |
| 2003/0035478 A1 * | 2/2003 | Taubman ................... 375/240.11 |
| 2005/0041814 A1 * | 2/2005 | Chen ............................ 381/1 |
| 2006/0008003 A1 * | 1/2006 | Ji et al. ....................... 375/240.11 |
| 2006/0083309 A1 * | 4/2006 | Schwarz et al. ........ 375/240.16 |
| 2006/0146937 A1 * | 7/2006 | Ye et al. .................... 375/240.19 |
| 2007/0147492 A1 * | 6/2007 | Marquant et al. ......... 375/240.1 |

(Continued)

OTHER PUBLICATIONS

H. Schwarz et al.: "Scalable Extension of H.264/AVC", ISO/IEC JTC1/CS29/WG11 MPEG04/M10569/S03, Mar. 2004, pp. 1-39 XP002340402.

(Continued)

*Primary Examiner* — Gregory Sefcheck
*Assistant Examiner* — Joshua Smith
(74) *Attorney, Agent, or Firm* — Tutunjian & Bitetto, P.C.

(57) ABSTRACT

Scalable video coding based on H.264/AVC uses motion compensation, which results in motion vectors and residual pictures. To optimize the encoding of the residual pictures of the enhancement-layer, they can be predicted from the base-layer. This requires complex encoders and decoders. Simplified residual prediction techniques are provided that focus on reducing the encoding and decoding complexity of the spatial scalable enhancement-layer with optimized coding efficiency. The method for encoding video data containing high-pass frames and low-pass frames comprises the steps of encoding the low-pass frames, wherein residual prediction may be used, splitting the high-pass frames into two interleaving frame groups, encoding the frames of the first of said frame groups, wherein residual prediction may be used, and encoding the frames of the second of the frame groups using an encoding method without residual prediction.

12 Claims, 2 Drawing Sheets

SRP: simplified residual prediction
ORP: original adaptive residual prediction
NoRP: No residual prediction

U.S. PATENT DOCUMENTS

2008/0232473 A1* 9/2008 Marquant et al. ........ 375/240.16

OTHER PUBLICATIONS

J. Reichel et al: "Scalable Video Model 3.0", ISO/IEC JTC1/SC29/WG11 N6716, Oct. 2004, pp. 1-85, XP002341767.

S. Sun & E. Francois: "Extended Spatial Scalability with Picture-Level Adaptation" Joint Video Team (JVT) of ISO/IEC MPEG & ITU-T VCEG (ISO/IEC JTC1/SC 29/WG11 and ITU-T SG16 Q.6), JVT-O08, Apr. 16, 2005, pp. 1-20, XP002347764.

"Recommendation H.263: Video coding for low bit rate communication", ITU-T Draft Recommendation H.263, Feb. 1998, pp. 1-167, XP002176560.

Search Report Dated Jan. 9, 2007.

* cited by examiner

SRP: simplified residual prediction
ORP: original adaptive residual prediction
NoRP: No residual prediction

METHOD AND APPARATUS FOR ENCODING VIDEO DATA, AND METHOD AND APPARATUS FOR DECODING VIDEO DATA

This application claims the benefit, under 35 U.S.C. §365 of International Application PCT/EP2006/061994, filed May 3, 2006, which was published in accordance with PCT Article 21(2) on Nov. 30, 2006 in English and which claims the benefit of European patent application No. 05300426.3, filed May 27, 2005.

FIELD OF THE INVENTION

This invention relates to a method and an apparatus for encoding video data, and to a method and an apparatus for decoding video data.

BACKGROUND

The H.264/AVC standard provides excellent coding efficiency but it does not consider scalable video coding (SVC). SVC provides different layers, usually a base-layer (BL) and an enhancement-layer (EL). The Motion Picture Expert Group (MPEG) works on enhanced functionality of the video codec. Various techniques were proposed, and the Joint Video Team (JVT) started a standard called JSVC, with corresponding reference software (JSVM). SVC provides temporal, SNR and spatial scalability for applications. The BL of JSVM is compatible with H.264, and most components of H.264 are used in JSVM as specified, so that only few components need to be adjusted according to the subband structure. Among all the scalabilities, spatial scalability is the most challenging and interesting, since it is hard to use the redundancy between the two spatial scalable layers.

SVC provides several techniques for spatial scalability, such as IntraBL mode, residual prediction or BLSkip (base layer skip) mode. These modes can be selected on macroblock (MB) level.

IntraBL mode uses the upsampled reconstructed BL picture to predict a MB in the EL, and only encodes the residual. Residual prediction tries to reduce the energy of the motion compensation (MC) residual of the EL by subtracting the upsampled MC residual of the BL. BLSkip mode utilizes the upsampled BL motion vector (MV) for a MB in the EL and requires only the residual to be written into the bit stream if a MB selects this mode. Thus, the BLSkip mode makes use of the redundancy between the MVs of a BL and its EL in the spatial scalability case.

For Inter coded pictures, including both P pictures and B pictures of SVC, residual prediction is used to decrease the energy of the residual for improving coding efficiency. The basic idea is to first get the predicted residual by upsampling the residual signal of the corresponding BL picture, wherein a 2-tap bilinear filter is used. Then the predicted residual is subtracted from the real residual which is obtained from the motion estimation in the EL, and the difference is coded by DCT, entropy coding etc.

Residual upsampling is commonly done MB by MB, and for each MB by 4×4, 8×8 or 16×16 subblocks, based on MC accuracy. If the MC accuracy is e.g. 16×16, the whole 16×16 MB uses just one motion vector; if the MC accuracy is 8×8, each four 8×8 sub-blocks may have different motion vectors. The residuals for different 8×8 sub-blocks have low correlation, so the upsampling process is done for four different sub-blocks. SVC utilizes a simple 2-tap bilinear filter, performing the upsampling process first in the horizontal and then in the vertical direction. The respective filter works on MB level, and thus cannot cross the boundary of an 8×8 block.

An option for the described procedure is whether to use residual prediction or not for a particular MB. A mode decision process tries different modes, all with or without residual prediction. This is called adaptive residual prediction.

The typical frame structure employed by H.264/SVC contains two intra-coded reference frames that are used at the receiver for Instantaneous Decoder Refresh (IDR), and then a number of intra-coded or inter-coded frames, which make several GOPs (group-of-pictures). Inter-coded frames can be interpolated or predicted. In wavelet decomposition, the EL of a GOP typically consists of several high-pass frames followed by a low-pass frame. A low-pass frame is used for both the preceding and the following high-pass frames, i.e. for two GOPs.

SUMMARY OF THE INVENTION

Using the predicted residual is a very complex process, both for the encoder and the decoder. Thus, a simplified processing is desirable that enables usage of less complex encoders and/or decoders. Disabling the residual prediction will reduce the decoder complexity by a factor of about two, but it reduces coding efficiency. On the other hand, adaptive residual prediction is a very potential technique that may improve coding efficiency of about 5-10% for the same objective quality (based on PSNR). Generally, it is desirable to substantially maintain or even improve the level of efficiency of the encoding and decoding processes. So it is advisable to enable residual prediction. But if e.g. for real-time applications residual prediction is enabled for every picture, known decoders are too slow for real-time decoding of e.g. a dual-layer (QCIF/CIF) spatial scalable bit-stream.

The present invention provides simplified residual prediction techniques, focusing on reducing the encoding and/or decoding complexity of the spatial scalable EL, with the coding efficiency being only slightly reduced or even improved.

According to one aspect of the invention, a method for encoding video data containing high-pass frames and low-pass frames, wherein the encoding is based on prediction and update steps, comprises the steps of encoding the low-pass frames, wherein residual prediction may be used, splitting the high-pass frames into two (preferably interleaving) frame groups, e.g. by assigning each of the high-pass frames to one group, e.g. according to their sequence number i.e. using a fixed raster, encoding the frames of the first of said frame groups, wherein residual prediction may be used, and encoding the frames of the second of the frame groups using an encoding method without residual prediction, i.e. residual prediction is prohibited for these frames.

In a preferred embodiment of this aspect of the invention, encoding the frames of the first of the frame groups comprises mode selection, wherein none of the possible encoding modes uses residual prediction on macroblock level. In one embodiment however at least one of the encoding modes for the first frame group uses residual prediction on frame level, which is called "Simplified Residual Prediction" herein. For simplified residual prediction, the EL residual is preferably generated from the information of the EL, and the BL residual is not used.

In a particularly preferred embodiment, the first frame group comprises the even high-pass frames and the second frame group comprises the odd high-pass frames.

In particular, the invention is advantageous for those highpass and low-pass frames that belong to an enhancement-layer of a scalable video signal. Thus, an improved and simplified residual prediction scheme for SVC is provided.

The resulting video signal generated by an encoder according to one embodiment of the invention comprises at least two spatially scalable layers, a BL and an EL, wherein the EL contains encoded low-pass frame data and encoded high-pass frame data, and wherein the encoded high-pass frame data contain an encoding mode indication and can be split into two types or groups, with the high-pass frame data of one of these groups containing an indication indicating if it was encoded using residual prediction, and at least some of them being encoded using residual prediction on frame level (simplified residual prediction) but not on MB level, and the high-pass frame data of the other of these groups being encoded without using residual prediction. Thus, these frames need not contain such residual prediction indication. The frame data of the second group contain fully encoded residual pictures, without using any residual prediction.

Thus, residual prediction can be skipped for the second group of high-pass frames, and it can be performed on frame level instead of MB level for the first group of high-pass frames. This leads to reduced complexity of encoders as well as decoders, since e.g. the frame needs not be split into blocks during encoding neither decoding.

As an example, if the size of a GOP is 16, its structure is (previous IDR frames not shown, with P being predicted frames and Bx being bilinear predicted frames): P1 B1 B2 B3 B4 B5 B6 B7 B8 B9 B10 B11 B12 B13 B14 B15 P2

According to a preferred embodiment of the invention, there is no residual prediction done for the odd frames: B1, B3, B5, B7, B9, B11, B13, B15

Simplified adaptive residual prediction is done for the even frames: B2, B4, B6, B8, B10, B12, B14

Original conventional Adaptive residual prediction: P1 P2

Advantageously, for the encoding method according to the invention there is no need to split the frames into MBs.

A corresponding device for encoding video data containing high-pass frames and low-pass frames, wherein the encoding is based on prediction and update steps, comprises means for encoding the low-pass frames, wherein residual prediction may be used,
means for splitting the high-pass frames into two (preferably interleaving) frame groups, e.g. by assigning each of them to one group, e.g. by their sequence number,
means for encoding the frames of the first of said frame groups, wherein residual prediction may be used, and
means for encoding the frames of the second of the frame groups using an encoding method without residual prediction. Further, the device may comprise means for inserting a residual prediction indication flag into the frames of the first frame group.

According to another aspect of the invention, a method for decoding video data containing encoded high-pass frames and encoded low-pass frames, wherein the decoding of at least the high-pass frames is based on inverse prediction and inverse update steps, comprises the steps of
decoding the low-pass frames according to their encoding mode, as indicated e.g. by an encoding mode flag,
determining from the sequential order (sequence number) of a high-pass frame whether it belongs to a first or a second group of frames ($B_{even}$, $B_{odd}$), and
decoding the high-pass frame, wherein if the high-pass frame belongs to the first group of frames ($B_{even}$) the decoding uses prediction of the residual that is used for the inverse prediction and inverse update steps, and if the high-pass frame belongs to the second group of frames the residual that is used for the inverse prediction and inverse update steps is obtained without prediction. Said prediction may use upsampling of the corresponding BL residual, but in principle also another prediction technique.

A corresponding device for decoding video data, the video data containing encoded high-pass frames and encoded low-pass frames, wherein the decoding of at least the encoded high-pass frames is based on inverse prediction and inverse update steps, comprises at least
means for decoding the low-pass frames according to their encoding mode,
means for determining from the sequential order of a high-pass frame whether it belongs to a first or a second group of frames ($B_{even}$, $B_{odd}$), and
means for decoding the high-pass frame, wherein if the high-pass frame belongs to the first group of frames ($B_{even}$) the means for decoding performs prediction of the residual that is used for the inverse prediction and inverse update steps, and if the high-pass frame belongs to the second group of frames the residual that is used for the inverse prediction and inverse update steps is obtained without prediction.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the principle of residual upsampling in horizontal direction.

DETAILED DESCRIPTION OF THE INVENTION

The following text refers to frames as well as to pictures. When frames are mentioned, the same applies to pictures and vice versa.

Figure 1:
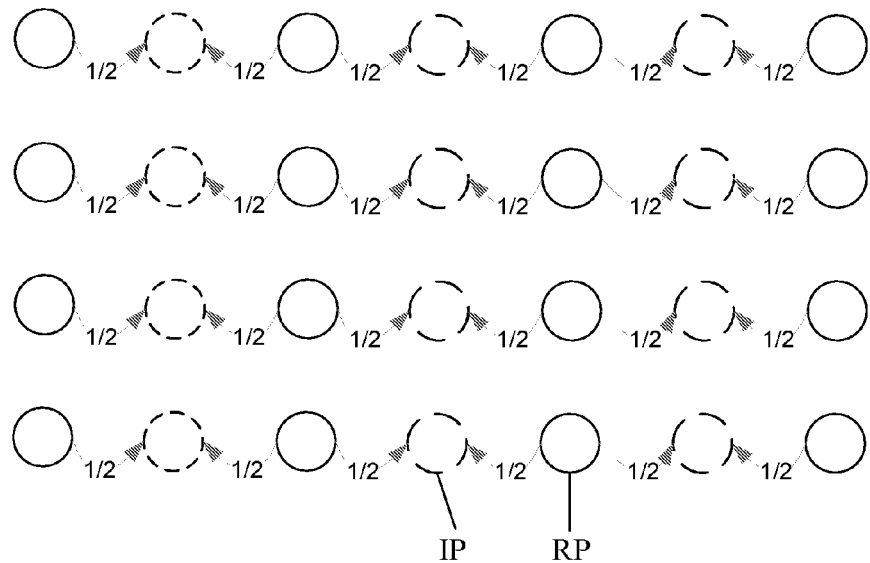

FIG. 1 shows the principle of residual upsampling in horizontal direction, using 4×4 motion estimation accuracy. SVC utilizes e.g. simple 2-tap bilinear filters, performing first an upsampling process on the horizontal direction and then on the vertical direction. An upsampled pixel value is generated by averaging two nearby original pixels, and the location of the upsampled pixel is just in the middle of the two original pixels, so the coefficients are [1/2, 1/2]. The 2-tap filter can't cross the MB boundary. While there is no problem at the left boundary, the upsampled pixel at the right boundary is just a copy of its nearest neighbor pixel. This is called "nearest neighboring method".

For the conventional upsampling, the whole residual picture must first be split into MBs and then into sub-blocks. This means a lot of memory copy operations and upsampling steps for small blocks. That is a main reason for the high complexity of the decoder when residual prediction is enabled.

The present invention discloses methods to reduce the complexity of the encoder and the complexity of the decoder, by adaptively using the residual prediction, partly skipping residual prediction and modifying the residual prediction method.

Typically, for each GOP there is one of the P-frames that is a low-pass frame. E.g. if the GOP size is 16, the parameter picture_id_inside_gop associated with the low-pass frame is 16. The other 15 frames being P- or B-frames are high-pass frames with different decomposition levels. The frames with the highest decomposition levels are those with odd numbers for picture_id_inside_gop: 1, 3, 5, 7, 9, 11, 13, 15. We call those pictures odd pictures. In this invention, we propose two solutions to substitute the conventional residual upsampling process.

One solution is doing the residual prediction using the conventional upsampling method. However, the process is not performed on blocks, but on the whole frame. This means that the 2-tap filter ignores any boundary within the frame until it reaches the boundary of the whole frame. Thus, there is no need to split the whole residual frame into MBs or sub-blocks.

The second solution is not to use any residual prediction at all for some frames, since once residual prediction is used (to improve the coding efficiency), adaptive type will be chosen in the mode decision process. That is, during mode decision all modes related to motion compensation will try two different sub-modes, the mode with residual prediction or the mode without residual prediction. A flag indicating which mode was chosen (residual_prediction_flag) will be written into each MB of a picture.

As experiments show, low-pass pictures have a high probability of using residual prediction. Typically about 30% of the MBs of a low-pass picture will enable the residual_prediction_flag. However, it was found that the higher the decomposition stage of the high-pass picture is, the less MBs use residual prediction. For the highest decomposition stage pictures (the odd pictures), only very few MBs have the residual_prediction_flag enabled.

According to the present invention, the high-pass frames of a GOP are split into two interleaving groups, and for the frames or pictures of one of these groups the residual prediction is done on frame level, while for all the frames of the other group the residual prediction is prohibited and can thus be skipped during mode decision.

In one embodiment of the present invention, the residual prediction is prohibited for all the odd pictures.

Advantageously, even if no residual prediction is used at all, the viewer can usually not notice the decrease in rate distortion (RD) performance, because the mode of only few MBs is changed. Another important reason is that when residual prediction is not used at all for any MB in the whole picture, then each MB will save one bit for the residual_prediction_flag. Even after entropy coding some bits will be saved, so that the coding efficiency for odd pictures is improved.

Actually, from the complexity point of view, if residual prediction is disabled, about half of the computation effort during the decoding process will be saved because the upsampling process can be skipped for each MB. This is advantageous for real-time decoders.

Another method to reduce the complexity of the decoder is for the other high-pass pictures (i.e. even high-pass pictures), we do the residual upsampling based on the whole frame. The advantage is that we don't actually need to detect the boundary of a motion estimation (ME) block, and the 2-tap filter will be implemented in the same way throughout the whole frame, until it encounters the boundary of the frame. So, we don't need to split the whole residual frame into blocks before residual upsampling. So we save the splitting time and the memory moving time for the small blocks.

Figure 2:
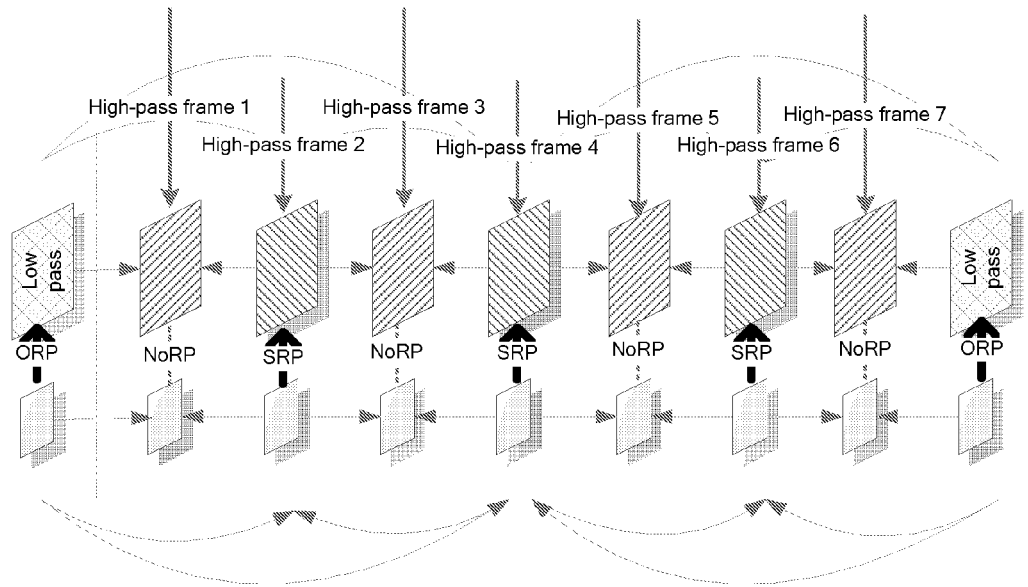
FIG. 2 a residual prediction scheme according to the invention for a GOP with GopSize=8.

As shown in FIG. 2, the original adaptive residual prediction (ORP) is utilized for low-pass pictures, in order to preserve high coding efficiency. For the highest decomposition stage, e.g. frames that have odd values of picture_id_inside_gop, no residual predication (NRP) is used and the residual_prediction_flag is saved for each MB in these frames. For the other high-pass frames (with picture_id_inside_gop=2, 4, 6), we can choose to use a weak residual prediction scheme, like e.g. the above-described Simplified Residual Prediction (SRP).

Figure 3:
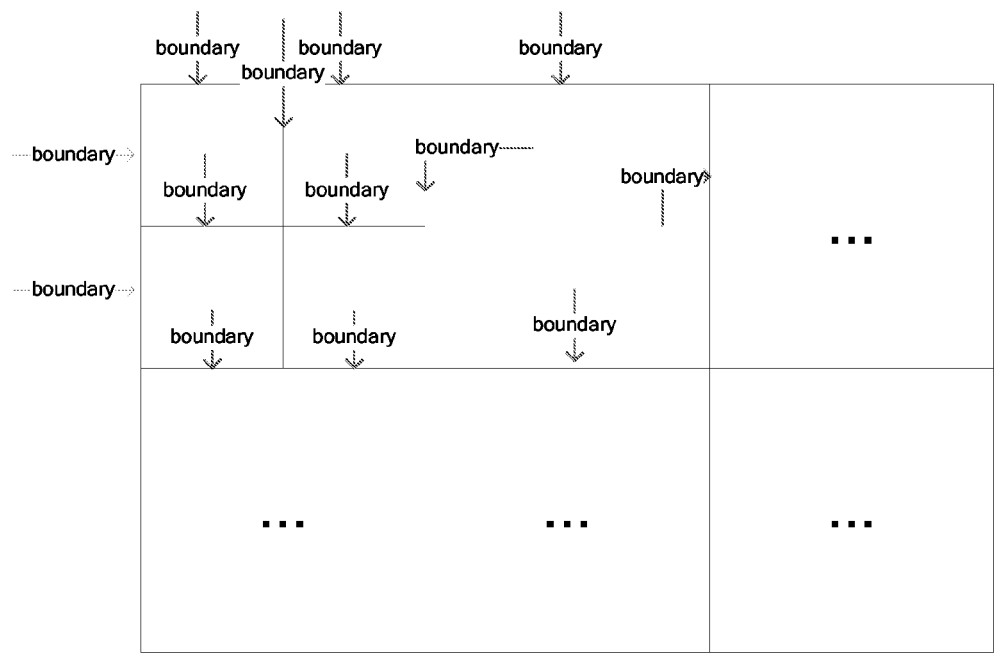
FIG. 3 block boundaries for conventional residual prediction.
Figure 4:
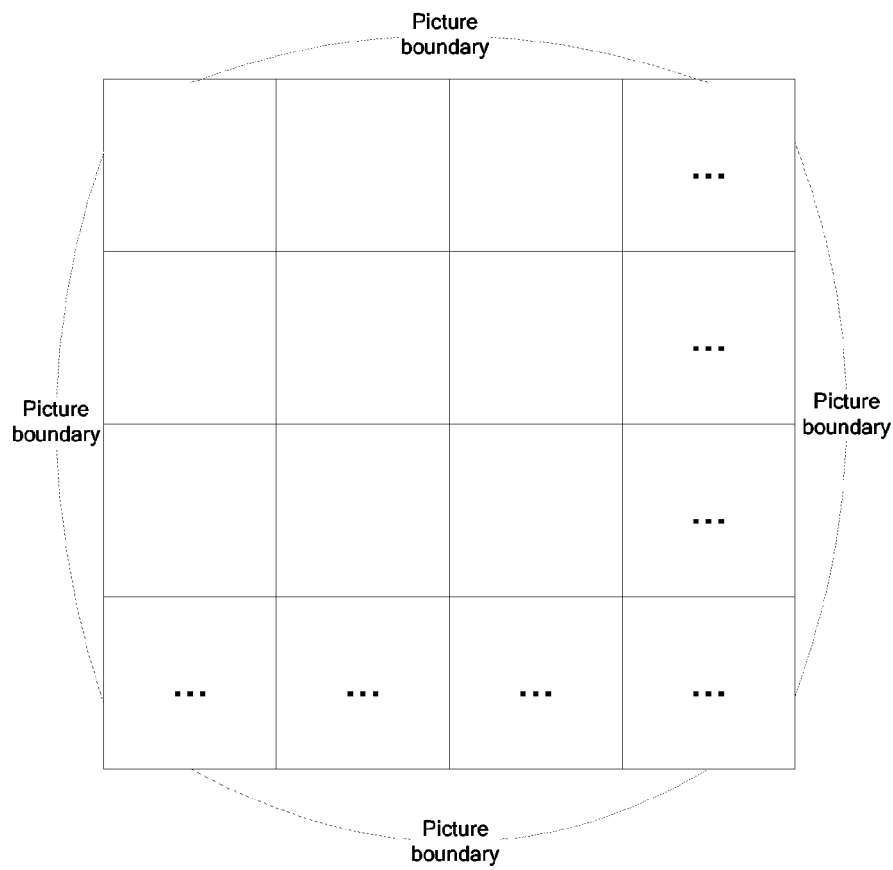
FIG. 4 simplified residual prediction.

FIG. 3 and FIG. 4 show the differences between residual prediction and simplified residual prediction. In the current JSVM residual prediction is done in blocks. When in FIG. 3 the filter encounters a boundary of a ME block, it will stop and the boundary of the upsampled residual will be predicted using the nearest neighboring method, as shown in FIG. 1. However, to reduce the complexity, we choose to simplify the residual prediction process employed for some high-pass pictures. In those cases when residual prediction is done, it doesn't need to be based on MB level any more. So the whole residual frame does not need to be split, and many memory operations are not required. For the 2-tap filter, there is no difference until the convolve operation reaches the right or bottom boundary of the frame, as shown in FIG. 4. The boundaries in FIGS. 3 and 4 are for the convolve operation.

In principle, the two described techniques being simplified residual prediction for at least some frames and the skipping of residual prediction for at least some of the other frames can also be used independent from each other, or in combination with other modes. E.g. the high-pass frames can be split into three groups, with one using conventional encoding, the second using simplified residual prediction and the third skipping residual prediction.

Further, other interleaving schemes can be applied than assigning even high-pass frames to one group and odd high-pass frames to the other group. E.g. the following scheme may be used:

No residual prediction for: B1-B3, B5-B7, B9-B11, B13-B15 Simplified adaptive residual prediction for: B4, B8, B12 And Original adaptive residual prediction for: P1 P2

Another possible scheme is e.g. to swap the previously described groups for "No residual prediction" and for "Simplified adaptive residual prediction".

When a decoder receives the video signal that results from the encoding method according to the invention, then it can determine from the sequence number of a particular B-frame whether residual prediction for it was skipped or not: e.g. all odd frames skip the residual prediction. Alternatively, it can evaluate if a frame contains the above-mentioned residual_prediction_flag that indicates that residual prediction might have been used. If this flag is not present, the decoder can deduce that residual prediction was skipped during encoding.

Adaptive residual prediction means that also other possible modes will be tested, e.g. inter4×4, inter16×16, inter8×8. So when we say adaptive residual prediction, all these modes may be tested with or without residual prediction. Thus, in the preferred embodiment of the invention mode selection is used for all high-pass frames (B1, . . . , B15), but:
- for the even frames the encoder can select between different modes, each with or without residual prediction; if residual prediction is selected, it will be on frame level, i.e. simplified residual prediction.
- for the odd frames the encoder can also select between different modes, but residual prediction is not allowed for any of the modes, i.e. residual prediction is disabled.

Thus, a high-pass frame includes an indication (e.g. a flag) that shows how it was encoded.

So, two decisions need to be made during encoding. The first is whether to use residual prediction or not for a frame. This flag indicating this option is already a part of the Picture Parameter Set (PPS), so it is an encoder issue. The second is how to do the residual prediction: the simplified or the original type. To indicate the result of this decision, one possibility is to add a flag into the PPS, which however should preferably be normative. Then the decoder can detect the corresponding decoding method from this flag.

In this invention, based on the different importance of the residual prediction for different decomposition levels of the Inter (high-pass) pictures, a simplified solution is proposed that greatly reduces the decoder complexity.

The invention can be used for video encoding and decoding, particularly when the video contains two or more spatial scalable layers and uses residuals resulting e.g. from motion estimation.

The invention claimed is:

1. Method for encoding video data, wherein the encoding is based on prediction and update steps, the method comprising the steps of:
    encoding low-pass frames of an enhancement layer of a spatially scalable video signal, wherein residual prediction on frame level is used, wherein the enhancement layer is structured into groups of pictures (GOPs) and each group of pictures (GOP) of the GOPs comprises a plurality of high-pass frames followed by one of said low-pass frames, and wherein said high pass frames and said low pass frames have assigned sequence numbers;
    splitting the high-pass frames into two interleaving frame groups;
    encoding the frames of a first interleaving frame group of said frame groups according to their sequence numbers, wherein residual prediction on frame level is used, wherein the encoding the frames of the first interleaving frame group comprises selection of one of a plurality of encoding modes and wherein at least one of the plurality of encoding modes uses residual prediction on frame level, but none of the plurality of encoding modes uses residual prediction on macroblock level; and
    encoding the frames of a second interleaving frame group of the frame groups using an encoding method without residual prediction.

2. Method according to claim 1, wherein the first frame group comprises even high-pass frames and the second frame group comprises odd high-pass frames.

3. Method according to claim 1, wherein the step of encoding the frames of the second frame group comprises mode selection.

4. Method according to claim 1, wherein residual prediction for a frame of the enhancement layer comprises upsampling a residual of a corresponding frame of a base layer.

5. Method according to claim 1, wherein the low-pass frames are P-frames and the high-pass frames are P-frames or B-frames of the enhancement layer.

6. Method according to claim 1, wherein the residual prediction on frame level for encoding the low-pass frames comprises upsampling base-layer information.

7. Method according to claim 6, wherein the upsampling is performed by a 2-tap bilinear filter across macroblock boundaries.

8. Method for decoding video data, wherein the decoding of at least encoded high-pass frames of said data is based on inverse prediction and inverse update steps, the method comprising the steps of:
    decoding encoded low-pass frames of an enhancement layer of a spatially scalable video signal according to an encoding mode of the low-pass frames, wherein the enhancement layer is structured into groups of pictures (GOPs) and each group of pictures (GOP) of the GOPs comprises a plurality of the high-pass frames followed by one of said low pass frames, and wherein each of said high pass frames and said low pass frames have assigned sequence numbers;
    determining from a sequential order of a given high-pass frame of the plurality of the high pass frames, according to the sequence number of the given high-pass frame, whether the given high pass frame belongs to a first group of frames or a second group of frames; and
    decoding the given high-pass frame, wherein if the given high-pass frame belongs to the first group of frames the decoding uses prediction on frame level of a residual that is used for the inverse prediction and inverse update steps, and if the given high-pass frame belongs to the second group of frames the residual that is used for the inverse prediction and inverse update steps is obtained without prediction.

9. Method according to claim 8, wherein residual prediction for a frame of the enhancement layer comprises upsampling the residual of a corresponding frame of a base layer.

10. Method according to claim 8, wherein the low-pass frames are P-frames and the high-pass frames are P-frames or B-frames of the enhancement layer.

11. Method according to claim 8, wherein the step of decoding encoded low-pass frames comprises spatial upsampling of base-layer information.

12. Method according to claim 11, wherein the upsampling is performed by a 2-tap bilinear filter across macroblock boundaries.

* * * * *